W. W. DAVIS.
COMBINED HARROW AND CULTIVATOR.
APPLICATION FILED OCT. 24, 1914.
1,142,081.
Patented June 8, 1915.
2 SHEETS—SHEET 2.
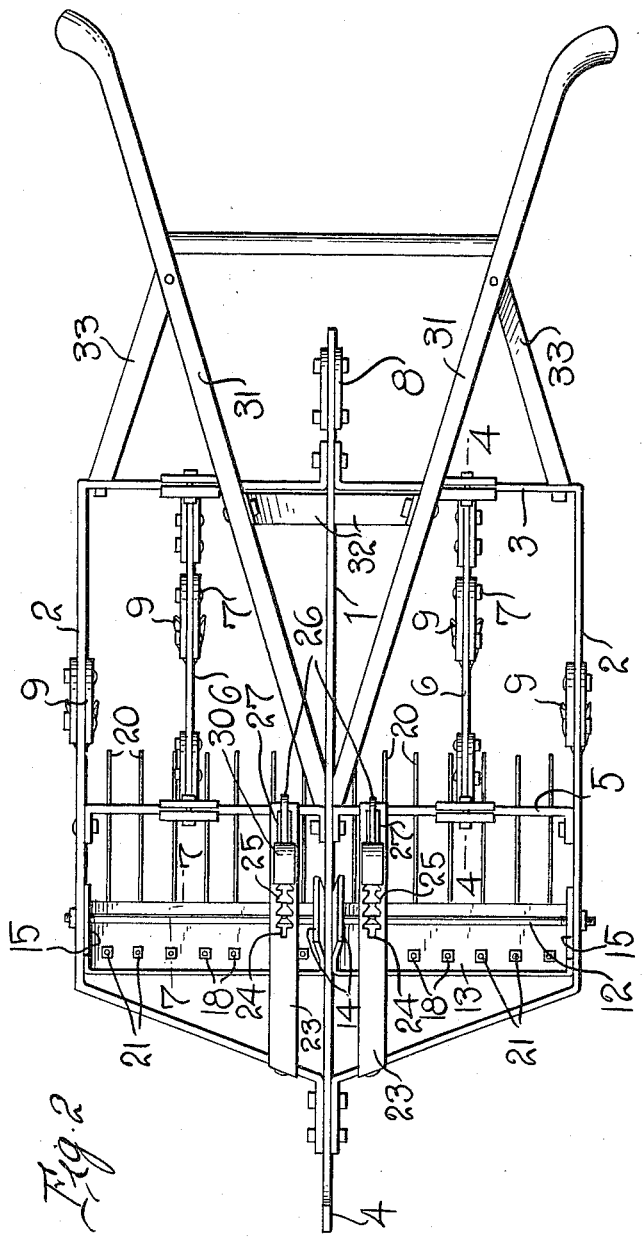
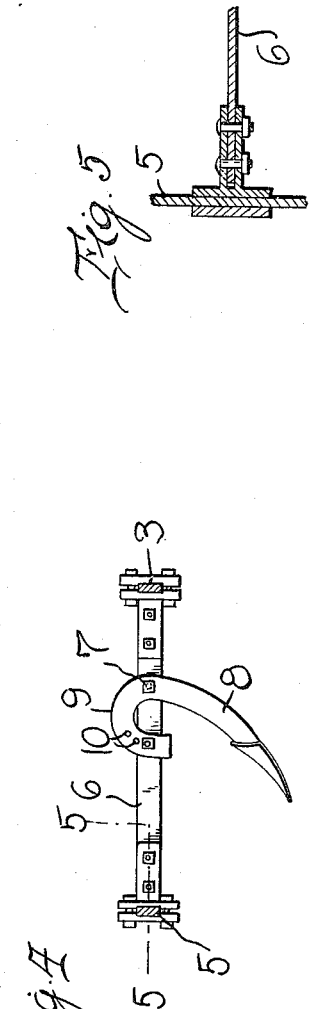
Witnesses
Robert M. Sutphen
A. I. Hind
Inventor
W. W. DAVIS
By Watson E. Coleman
Attorney

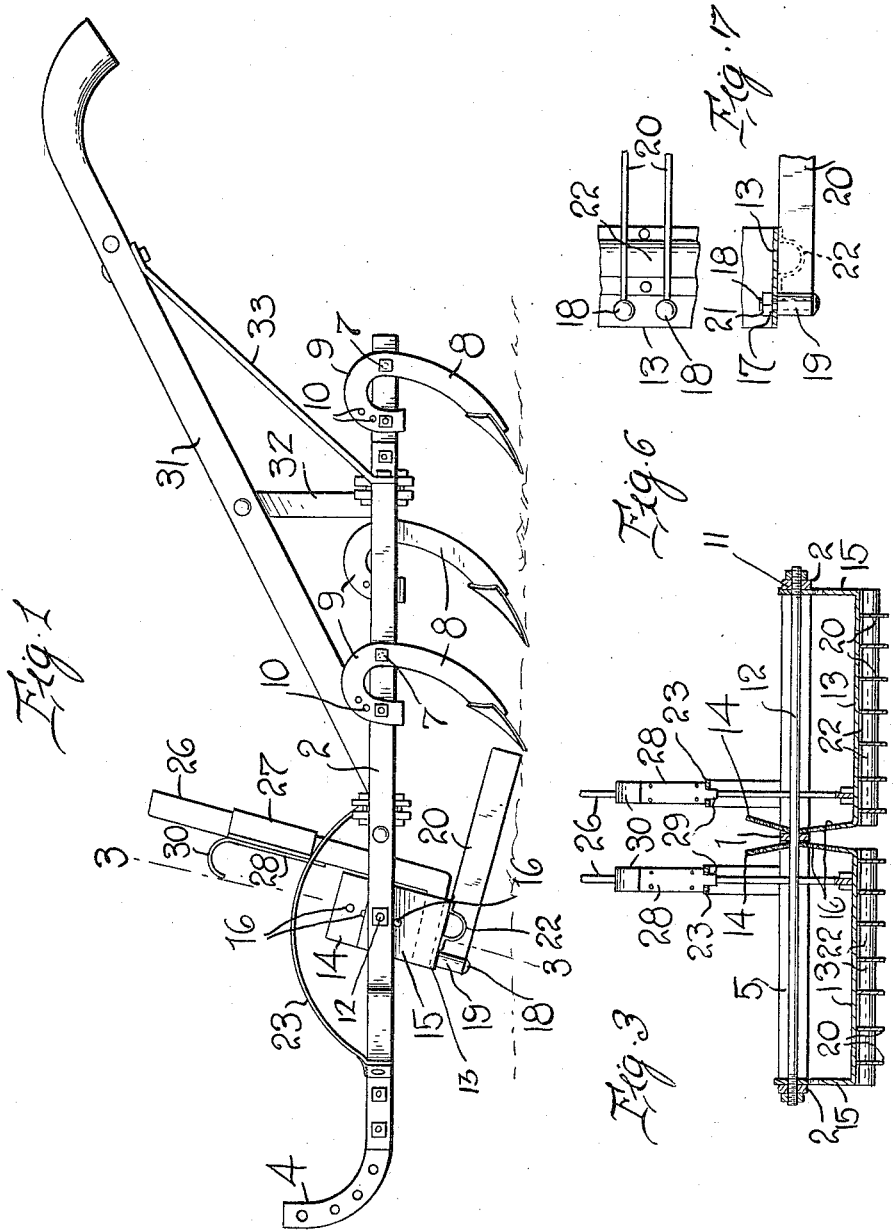

UNITED STATES PATENT OFFICE.

WILLIAM W. DAVIS, OF SYLACAUGA, ALABAMA.

COMBINED HARROW AND CULTIVATOR.

1,142,081. Specification of Letters Patent. Patented June 8, 1915.

Application filed October 24, 1914. Serial No. 868,430.

*To all whom it may concern:*

Be it known that I, WILLIAM W. DAVIS, a citizen of the United States, residing at Sylacauga, Route No. 3, in the county of Coosa and State of Alabama, have invented certain new and useful Improvements in Combined Harrows and Cultivators, of which the following is a specification, reference being had to the accompanying drawings.

This invention relates to improvements in agricultural implements, and particularly to combined harrows and cultivators.

An object of this invention is the provision of a combined harrow and cultivator which includes a frame upon which plows and pulverizing blades are supported, the pulverizing blades and plows being adjustable so that either a ridge or a furrow may be formed between the rows.

Another object of this invention is the provision of an agricultural implement of this character in the frame of which knife heads are pivotally mounted to which longitudinally extending cutting blades are connected, means being provided to support the knife heads in adjusted position so that the blades will engage in the ground to the desired depth.

With these and other objects in view, as will become more fully apparent as the description proceeds, my invention consists in the novel construction, combination and arrangement of parts to be hereinafter more fully described, claimed and illustrated in the accompanying drawing, in which—

Figure 1 is a side elevational view of my device; Fig. 2 is a top plan view thereof; Fig. 3 is a sectional view on the line 3—3 of Fig. 1; Fig. 4 is a detail view showing the mounting of one of the plow beams in the frame; Fig. 5 is a sectional view on the line 5—5 of Fig. 4; Fig. 6 is a fragmentary bottom plan view of one of the cutting blade supporting plates; and Fig. 7 is a detail view showing the manner of connecting one of the blades to one of the plates.

Referring more particularly to the drawing, my improved implement includes a frame which consists of a center bar 1 and two parallel side bars 2, the ends of which are bent inwardly and secured to the side faces of the center bar, the inturned ends 3 forming the end portions of the frame. The ends of the center bar project forwardly and rearwardly of the frame, the forward end of the center bar being turned upwardly as at 4 to provide a support for any suitable animal attaching means. Secured at their ends to the side bars 2 and center bar 1 intermediate of the ends of the frame are transversely extending brace bars 5, and connected at their forward ends to the brace bars 5 and at their rear ends to the rear inturned ends 3 of the side bars are plow supporting beams 6 through the rear ends of which pivot pins 7 are passed upon which plow standards 8 are pivotally mounted.

Pivotally mounted on the rearwardly projecting end of the center bar 1 and also on the side bars 2 forwardly of the standards 8 mounted on the brace bars 5, are similar plow standards 8, each of the standards having a forwardly and downwardly curved upper end 9 in which a series of openings 10 is formed, whereby bolts or other suitable fastening devices may be passed through the openings 10 and through openings in the bars upon which the standards are mounted, whereby the standards may be secured in any desired adjusted position with relation to the frame.

The side bars 2 and the center bar 1 forwardly of the brace bars 5 are provided with transversely alined openings 11 through which a supporting rod 12 is engaged, and mounted on the supporting rod on opposite sides of the center bar 1 are knife supporting plates 13 which are substantially U-shaped, the inner ends 14 of the plates being of relatively greater length than the outer ends 15 thereof. Formed in each vertically disposed end of the plates is a vertical series of openings 16, the supporting rod 12 being adapted for engagement through the alined openings 11 and through one of the openings of each upturned end of the plates 13 to pivotally connect the plates to the frame. Formed in the body portion of each plate adjacent its forward edge is a longitudinally extending series of openings 17, through which the upper ends of supporting bolts 18 are passed, the looped forward ends 19 of rearwardly extending cutting blades 20 being engaged around the bolts, the blades 20 being secured to the bolts by the nuts 21 which are threadedly engaged on the upper ends of the bolts and bear against the upper faces of the plates 13. To hold the blades 20 in their rearwardly extending parallel arrangement, and to prevent the same from swinging on the bolts, downwardly curved spacing plates 22 are secured to the under faces of the plates 13, the opposite edges of the plates 22 being closely engaged against the opposed faces of the adjacent blades.

Secured at their forward ends to the front inturned ends of the side bars 2 and at their rear ends to the brace bars 5 on opposite sides of the center bar are upwardly bowed rack bars 23 which are provided adjacent their rear ends with longitudinally extending slots 24, the walls of the slots being formed with rack teeth 25. Projecting through the slots 24 in the rack bars are the levers 26, the lower ends of which are secured to the plates 13, and slidably mounted on the upper ends of the levers above the rack bars are sleeves 27 to which locking plates 28 are connected, the lower ends of the locking plates being reduced as at 29 and the reduced ends of the plates being extended below the sleeves 27 for engagement through the slots 24 forwardly of the levers, the side edges of the reduced ends 29 being adapted for engagement with the rack teeth to hold the levers in adjusted position. The upper ends of the locking plates 28 are curved forwardly and downwardly to provide finger pieces 30 whereby the sleeves may be readily raised to disengage the locking ends 29 of the plates from the rack teeth so that the levers may be adjusted to regulate the depth to which the cutting blades 20 are engaged in the ground.

Connected at their lower ends to the center bar 1 rearwardly of the brace bars 5 are rearwardly inclined diverging handles 31, the handles being secured in their inclined positions by suitable braces 32 which are secured at their lower ends to the opposite faces of the center bar, and at their upper ends to the handles intermediate of their ends, the handles being further supported by other braces 33, which are connected at their lower ends to the inturned rear ends of the side bars 2, and at their upper ends to the handles adjacent the upper ends of the same.

In the practical use of my implement, the frame is drawn over the ground by an animal in the ordinary way, the same being guided by an operator who grasps the handles 31, and when the implement is desired for use as a harrow, the knife supporting plates 13 are supported in the frame so that all of the blades 20 are arranged to engage in the ground at the same depth, the plow standards 8 being adjusted with the plows carried thereby engaging in the ground at the desired depth. If it is desired to cultivate the ground so that a ridge is formed between the rows of grain or the like, the supporting rod 12 is removed so that the plates 13 may be arranged with their inner ends disposed higher than the outer ends thereof, whereby when the supporting rod is passed through the alined openings 11 in the side bars and center bar of the frame, and through one of the openings in the outer end of each supporting plate and through one of the lowermost openings in the inner end of each supporting plate, the plates are carried by the frame in such position that the blades in the center of the frame are raised above the blades at the side of the frame. With the cutting blades in this position, the plow standard on the rear of the center beam and the standard supported on the beams 5 are adjusted so that the plows carried thereby are arranged above the plows supported on the beams carried by the side bars 2, so that as the implement is drawn over the ground a ridge is left below the longitudinal center of the frame. When it is desired to form a furrow between the rows, the rod 12 is removed so that the same may be passed through one of the upper openings in the vertical series formed in the inner upstanding end of each plate 13, whereby the blades 20 adjacent the center of the frame are disposed below the blades adjacent the sides of the frame. The plow standards 8 are then adjusted so that the plows carried by the standards on the center bar and on the beams 6 are arranged below the standards carried by the side bars so that as the machine is drawn over the ground a longitudinal furrow is formed between the rows. The distance to which the blades 20 engage in the ground to pulverize the same may be readily adjusted without disengagement of the supporting rod 12, it being merely necessary in performing this adjustment, to raise the sleeves 27 on the upper ends of the levers 26 so as to disengage the reduced lower ends of the locking plates 28 from the rack teeth, whereupon the levers may be swung forwardly or rearwardly as desired, to raise or lower the rear ends of the blades to the desired position with relation to the frame, whereupon the sleeves may be released so that the locking ends 29 of the plates 28 may again engage the rack teeth to hold the plates and blades in adjusted position.

Having thus fully described my invention, what I desire to claim and secure by Letters Patent is:

1. A device of the character described including a frame, a plurality of longitudinally extending cutting blades pivotally carried thereby, means for adjusting the elevation of the pivotal points of the blades with respect to the frame, and means for swinging the blades for adjusting the depth to which the same may engage in the ground.

2. A device of the character described including a frame, a plurality of longitudinally extending cutting blades carried by the frame, said blades being arranged in independent transversely alined sets, and independent operating means for swinging each set for controlling the depth to which the blades engage in the ground.

3. A device of the character described comprising a frame, said frame including a center bar and parallel side bars, a supporting rod extending through said side bars and center bar, substantially U-shaped supporting plates pivotally mounted on said supporting rod on opposite sides of the center bar, rearwardly extending parallel cutting blades carried by said plates, means for rocking said plates on said supporting rod to adjust the depth to which said blades extend, and means for holding said blades in any desired adjusted position.

4. A device of the character described comprising a frame including a center bar and parallel side bars, a supporting rod detachably engaged through said center bar and said side bars, a pair of substantially U-shaped supporting plates each having a longitudinal series of openings in each end thereof, said plates being positioned on opposite sides of the center bar of the frame, said supporting rod being engaged through one of the openings in each of the ends of said plates whereby the plates are pivotally carried by the frame, means for rocking said plates on said supporting rod whereby to adjust the depth to which the blades extend, and means for holding said plates in any desired adjusted position.

5. A device of the character described comprising a frame including a center bar and parallel side bars, a supporting rod detachably engaged through said center bar and said side bars, substantially U-shaped supporting plates arranged in the frame on opposite sides of said center bar, each of said plates having a longitudinal series of openings in its ends, said rod being adapted to engage with one of the openings in each end of the plates whereby said plates are pivotally supported in the frame, each of said plates having a longitudinal series of openings in the body portion thereof adjacent its forward edge, rearwardly extending knife blades having looped forward ends alined with the openings in the body portions of said plates, bolts disposed through the looped portions of the blades and the openings to secure the blades to the plates, spacing plates secured to the under faces of the blade supporting plates and arranged between the opposing faces of the adjacent blades to maintain the same in their parallel relation, means for adjusting said blade supporting plates whereby the blades may be disposed to engage to any desired depth, and means for holding said blade supporting plates in adjusted position.

6. A device of the character described including a supporting frame, a plurality of swingingly mounted cutting blades carried by the frame, said blades being arranged in independent transversely alined sets, means for independently adjusting the pivotal axis of each set of blades, whereby the cutting edges of each set of blades may be independently disposed in a number of different planes, bearing different angular relation to the ground, and means for independently swinging each set of blades, after the pivotal axis of the same has been set.

7. A device of the character described including a main frame, a plurality of transversely alined sets of cutting blades, the cutting blades of each set being disposed in parallel relation to each other and in longitudinal relation to the frame, the cutting edges of all the blades of each set being disposed in a common plane, means whereby the plane of the cutting edges of each set may be regulated for disposing each set of cutting blades in a plane parallel to or at an angle to the plane of the main frame, and means for independently swinging each set of blades for regulating the depth to which the same is to engage in the ground.

8. A device of the character described including a supporting frame, a plurality of longitudinally extending cutting blades swingingly mounted in the frame, said cutting blades being arranged in independent sets which are transversely alined, the blades of each set being fixed with respect to each other and being movable as an entirety, means for adjusting the elevation of the blades at the inner end of each set, independent means for adjusting the elevation of the blades at the outer end of each set, and independently operable controlling means for swinging each set of blades with respect to the frame, whereby the depth to which the blades engage in the ground may be regulated.

In testimony whereof I hereunto affix my signature in the presence of two witnesses.

WILLIAM W. DAVIS.

Witnesses:
C. L. CAUDLE,
B. J. ESTES.